(12) United States Patent
Wang

(10) Patent No.: US 12,250,601 B2
(45) Date of Patent: Mar. 11, 2025

(54) COMMUNICATION METHOD, DEVICE AND COMPUTER READABLE MEDIUM IN WIRELESS COMMUNICATION SYSTEM

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 17/624,643

(22) PCT Filed: Jul. 5, 2019

(86) PCT No.: PCT/CN2019/094851
§ 371 (c)(1),
(2) Date: Jan. 4, 2022

(87) PCT Pub. No.: WO2021/003598
PCT Pub. Date: Jan. 14, 2021

(65) Prior Publication Data
US 2022/0264394 A1    Aug. 18, 2022

(51) Int. Cl.
*H04W 36/00* (2009.01)
*H04W 36/36* (2009.01)

(52) U.S. Cl.
CPC ... *H04W 36/0079* (2018.08); *H04W 36/0061* (2013.01); *H04W 36/00837* (2018.08); *H04W 36/362* (2023.05)

(58) Field of Classification Search
CPC ......... H04W 36/0079; H04W 36/0061; H04W 36/00837; H04W 36/36
See application file for complete search history.

(56) References Cited

U.S. PATENT DOCUMENTS

| 2016/0014839 A1 | 1/2016 | Liu et al. |
| 2016/0021561 A1 | 1/2016 | Wang et al. |
| 2018/0227805 A1 | 8/2018 | Jang et al. |

(Continued)

FOREIGN PATENT DOCUMENTS

| CN | 107113673 A | 8/2017 |
| CN | 108632926 A | 10/2018 |

(Continued)

OTHER PUBLICATIONS

International Search Report for PCT/CN2019/094851 dated Apr. 3, 2020.

(Continued)

*Primary Examiner* — John D Blanton
(74) *Attorney, Agent, or Firm* — Sughrue Mion, PLLC

(57) ABSTRACT

Embodiments of the present disclosure relate to method, device and computer readable medium for reporting the failure of the conditional handover (CHO) attempt. The method comprises obtaining configuration information about candidate cells for conditional handover of the terminal device. The method further comprises initiating at least one conditional handover attempt to the at least one candidate cell. The method also comprises in response to determining that in response to that at least one conditional handover attempt to the at least one candidate cell in a conditional handover procedure is failed, storing failure information of the at least one conditional handover attempt. In this way, a new mechanism of the failure reporting may be achieved.

6 Claims, 6 Drawing Sheets

(56) References Cited

U.S. PATENT DOCUMENTS

| | | | |
|---|---|---|---|
| 2018/0279193 A1 | 9/2018 | Park et al. | |
| 2020/0267604 A1* | 8/2020 | Hwang | H04W 36/0064 |
| 2020/0351731 A1* | 11/2020 | Kim | H04W 36/0079 |
| 2021/0377831 A1* | 12/2021 | Yan | H04W 36/00838 |
| 2022/0201582 A1* | 6/2022 | Eklof et al. | H04W 24/08 |

FOREIGN PATENT DOCUMENTS

| | | |
|---|---|---|
| EP | 3949511 A1 | 2/2022 |
| WO | 2018156696 A1 | 8/2018 |
| WO | 2018/203716 A1 | 11/2018 |
| WO | 2019/029015 A1 | 2/2019 |
| WO | 2019/098135 A1 | 5/2019 |

OTHER PUBLICATIONS

Written Opinion for PCT/CN2019/094851 dated Apr. 3, 2020.

Japanese Office Action dated Mar. 14, 2023 in Japanese Application No. 2022-500087.

Apple, "Details of Conditional Handover", 3GPP TSG-RAN WG2 Meeting #106, R2-1907177, Resubmission of R2-1903614, Reno, USA, May 13-17, 2019 (4 pages total).

China Telecom, "[Offline Discussion-081] summary of NR agreements that could be 'imported' to LTE", 3GPP TSG-RAN WG2 Meeting #106, R2-1908431, Reno, USA, May 13-17, 2019 (9 pages total).

NEC, "RLF report for CHO", 3GPP TSG-RAN WG2 #107, R2-1909660, Prague, Czech Republic, Aug. 26-30, 2019 (3 pages total).

Chinese Office Action dated Jun. 29, 2023 in Chinese Application No. 201980097665.X.

LG Electronics Inc., "Consideration on CHO Failure", 3GPP TSG-RAN WG2 Meeting #106, R2-1907998, Revision of R2-1905098, Reno, USA, May 13-17, 2019 (3 pages total).

Extended European Search Report dated Jun. 17, 2022 from the European Patent Office in EP Application No. 19936563.6.

* cited by examiner

COMMUNICATION METHOD, DEVICE AND COMPUTER READABLE MEDIUM IN WIRELESS COMMUNICATION SYSTEM

CROSS REFERENCE TO RELATED APPLICATIONS

This application is a National Stage of International Application No. PCT/CN2019/094851 filed Jul. 5, 2019.

TECHNICAL FIELD

Embodiments of the present disclosure generally relate to the field of communication, and in particular, to communication method, device and computer readable medium for reporting the failure of the conditional handover (CHO) attempt.

BACKGROUND

As well known, a terminal device may handover from a source cell to a target if a handover (HO) procedure is successful performed. However, the HO failure mainly happens due to HO command transmission failure. To improve the handover reliability, Condition Handover (CHO) has been agreed to be applied in Rel-16 LTE and NR.

When the channel between the source network device (a gNB or an eNB) and the terminal device is still under good condition, the source network device may transmit CHO configuration associated with multiple CHO candidate cells including configuration of CHO candidate cells and CHO execution condition to the terminal device. Once there is any CHO candidate cell meets the CHO execution condition, for example, the channel state between a target cell the CHO candidate cell and the terminal device is offset better than the channel state between the serving cell and the terminal device, the terminal device can perform autonomous connection with target cell, without the source network device to send message to indicate the start of CHO execution.

SUMMARY

In general, example embodiments of the present disclosure provide method, device and computer readable medium for reporting the failure of the conditional handover (CHO) attempt.

In a first aspect, there is provided a method implemented at a terminal device. The method comprises obtaining configuration information about candidate cells for conditional handover of the terminal device. The method further comprises initiating at least one conditional handover attempt to the at least one candidate cell. The method also comprises in response to determining that in response to that at least one conditional handover attempt to the at least one candidate cell in a conditional handover procedure is failed, storing failure information of the at least one conditional handover attempt.

In a second aspect, there is provided a method implemented at a terminal device. The method comprises obtaining configuration information about candidate cells for conditional handover of the terminal device. The method further comprises initiating at least one conditional handover attempt to the at least one candidate cell. The method also comprises in response to determining that in response to that at least one conditional handover attempt to the at least one candidate cell in a conditional handover procedure is failed, ignoring the failure of the at least one conditional handover attempt.

In a third aspect, there is provided a terminal device. The transmitting device comprises a processor; and a memory coupled to the processing unit and storing instructions thereon, the instructions, when executed by the processing unit, causing the device to perform actions according to the first aspect.

In a fourth aspect, there is provided a terminal device. The transmitting device comprises a processor; and a memory coupled to the processing unit and storing instructions thereon, the instructions, when executed by the processing unit, causing the device to perform actions according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
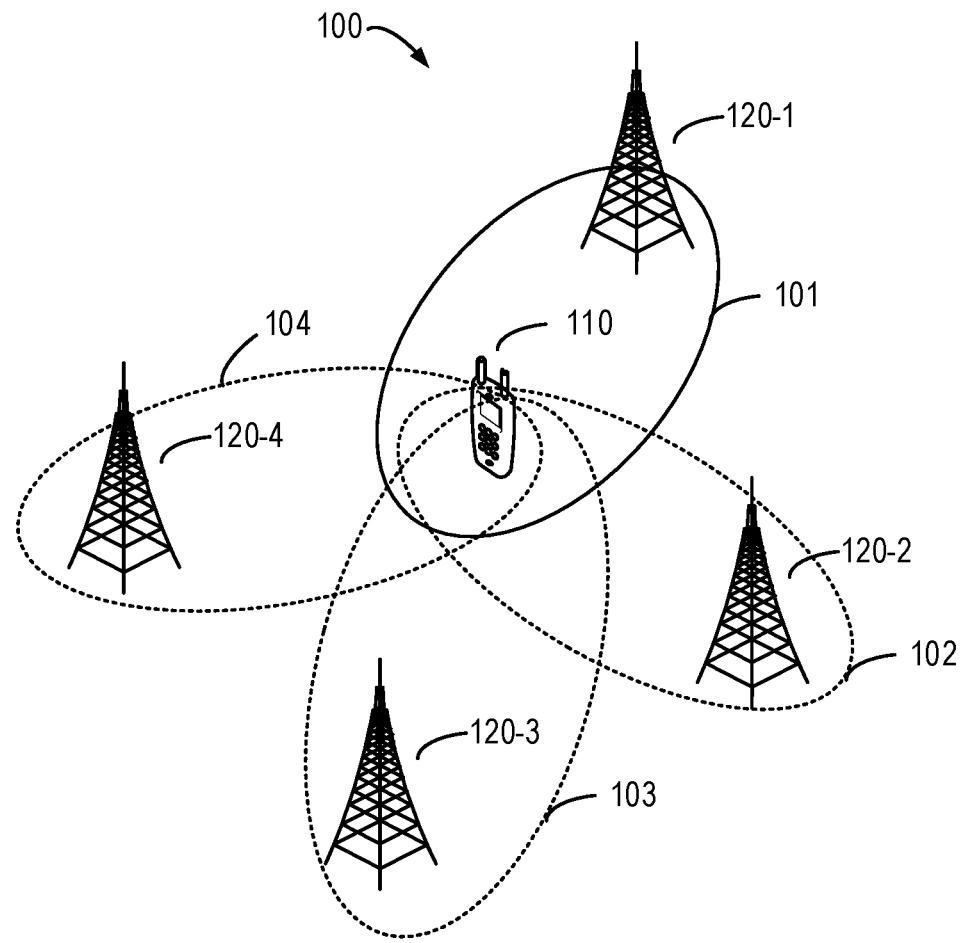
FIG. 1 is a schematic diagram of a communication environment in which some embodiments according to the present disclosure can be implemented.

FIG. 1 shows an example communication network 100 in which embodiments of the present disclosure can be implemented. The network 100 includes a terminal device 110 and network devices 120-1 to 120-4 (collectively referred to as network device 120). The terminal device 110, for example, may be served by the network device 120-1. The serving area of the network device 120-1 is called as a cell 101. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be in the cell 101 and served by the network device 120-1.

In the communication network 100, the network device 120 can communicate data and control information to the terminal device 110 and the terminal device 110 can also communication data and control information to the network device 120. A link from the network device 120 to the terminal device 110 is referred to as a downlink (DL) or a forward link, while a link from the terminal device 110 to the network device 110 is referred to as an uplink (UL) or a reverse link.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In the communication network 100, if the channel state between the terminal device 110 and the network device 120-1 is getting worse, the network device 120-1 may initiate a handover (HO) procedure to inform the terminal device 110 to handover from its serving cell to a target cell. During a handover procedure, the terminal device 110 may attempt to access to the target cell. If the handover procedure is successful executed, the terminal device 110 may be served by other serving area, for example, the serving cell 102 of the network device 120-2.

However, if the terminal device 110 does not receive a response from the network device 120-2 indicating the access attempt is successful until a timer for the handover procedure expires, the access attempt is failed. The failure information of this failed access attempt, which may be referred to a Handover Failure (HOF), may be recorded at the terminal device 110.

Furthermore, if the connection between the terminal device 110 and its serving network device 120-1 is failed, the failure information of the failed connection, which may be referred to a Radio Link Failure (RLF), may also be recorded at the terminal device 110.

The terminal device 110 may indicate the availability of RLF-report information in the subsequent RRC connection (re-)establishment and handover to a target cell. If the a high-level device requires RLF-report, the new connected network device (for example, the network device 120-2) may send UEInformationRequest message to request the terminal device 110 to feedback the RLF-report information, and the terminal device 110 would reply using UEInformationResponse message.

The recorded failure information may be introduced into a RLF-report variable. According to the current failure recording mechanism, the terminal device 110 can only store information for the latest RLF or HOF. The terminal device 110 always clears the information included in the current RLF report variable before setting the information field.

As described above, Condition Handover (CHO) has been proposed to improve the handover reliability. For the conditional handover procedure, the network device 120-1 may transmit CHO configuration associated with multiple CHO candidate cells (for example, cells 102-104 as shown in FIG. 1) including configuration of CHO candidate cells and CHO execution condition to the terminal device 110 when the channel between the network device 120-1 and the terminal device 110 is still under good condition.

As an option, once there is any CHO candidate cell meets the CHO execution condition, the terminal device 110 may perform autonomous access attempt to the CHO candidate cells, without the network device 120-1 to send message to indicate the start of CHO execution. Since a set of candidate cell may be provided to the terminal device 110 to execute the conditional handover procedure, it is possible that multiple access attempt may be performed before the handover is successful.

As another option, if there is a RLF or a COH has been occurred, the CHO procedure may be initiated by the terminal device 110 even if the CHO candidate cells does not meet CHO execution condition.

According to the failure recording mechanism as mentioned above, the previous failure information may always be removed before recording new failure information. In this case, the RLF report may not reflect the overall network state. For example, the information about RLF and HOF, which may be recorded before the CHO executes, may be removed when the failure information of the CHO is to be recorded. Furthermore, if the CHO execution attempt to multiple CHO candidate cells fails, the terminal device 110 can only submit RLF report related to the last CHO execution. Moreover, how to indicate the handover failure in the CHO procedure is still discussed.

For this propose, a method for reporting the failure of the conditional handover (CHO) attempt will be discussed in the present disclosure.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 2:
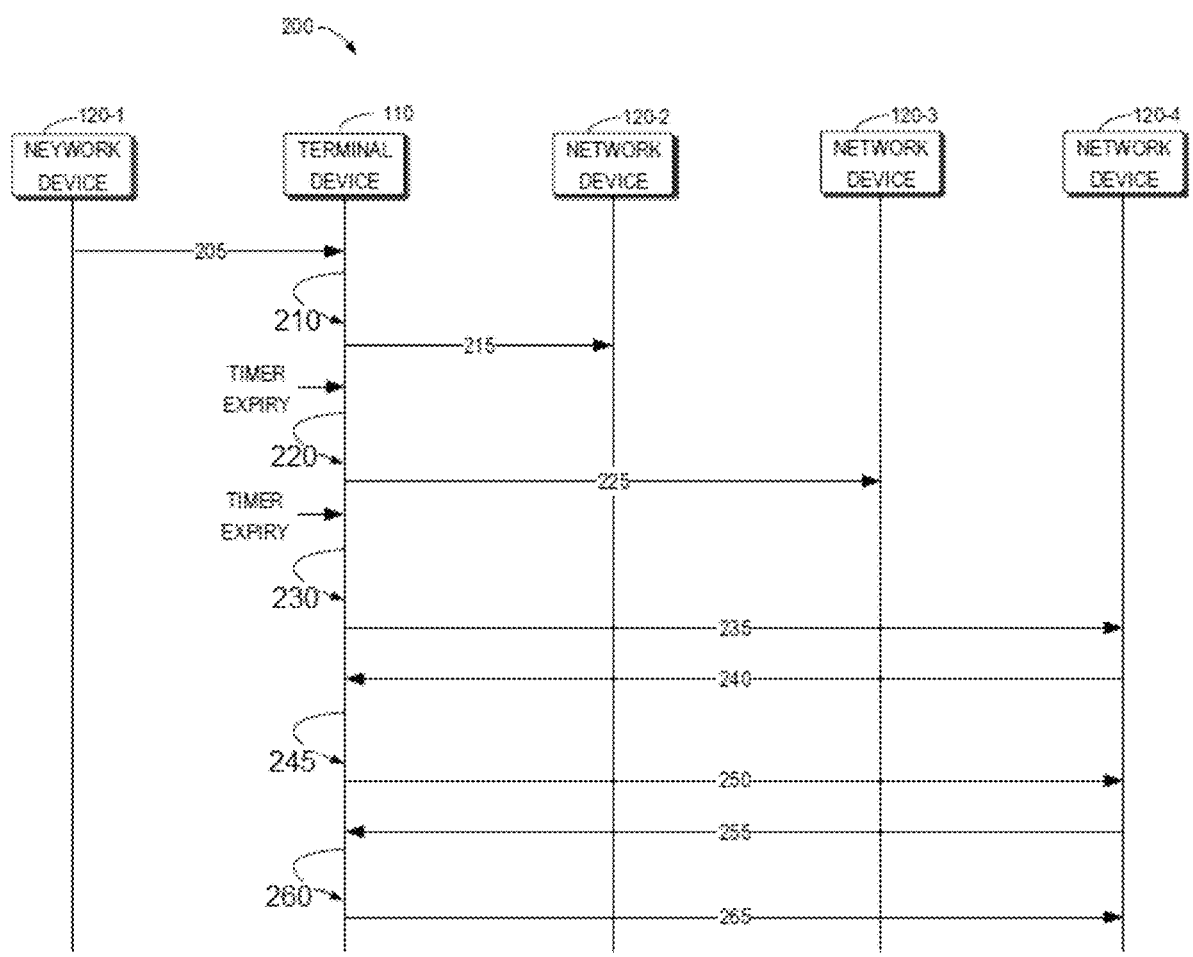
FIG. 2 illustrates a schematic diagram illustrating a process 200 for reporting the failure of CHO attempt according to example embodiments of the present disclosure.

FIG. 2 illustrates a schematic diagram illustrating a process 200 for reporting the failure of CHO attempt according to example embodiments of the present disclosure. For the purpose of discussion, the process 200 will be described with reference to FIG. 1. The process 200 may involve the terminal device 110 and the network devices 120-1 to 120-4 as illustrated in FIG. 1.

As shown in FIG. 2, the terminal device 110 obtains 205, from the network device 120-1, configuration information about candidate cells for CHO. The configuration information may be transmitted from the network device 120-1 when the channel between the network device 120-1 and the terminal device 110 is still under good condition. The configuration information may comprise the cell ID for each of the candidate cells and other related configuration for CHO. For example, the candidate cells may be referred to the cells 102-104 as shown in FIG. 1.

If the condition for triggering the CHO is reached, for example, the channel state between the network device 102-2-102-4 and the terminal device 100 if offset better than the channel state between the network device 120-1 and the terminal device 110 the terminal device 110 may initiate 210 the CHO. The terminal device 110 may execute at least one conditional handover attempt to the candidate cells.

For the first conditional handover attempt, the terminal device 110 may, for example, transmit 215 an access request to one of the candidate cells, for example, cell 102 of the network device 120-2. If the timer for a conditional handover attempt expiries and no response received from the network device 120-2, the handover attempt may be considered as a failed attempt. If the handover attempt to the cell 102 is failed, the terminal device 110 stores 220 the failure information of the failed conditional handover attempt.

In some example embodiments, the terminal device 110 may determine whether the failure of the first handover attempt to the cell 102 in the CHO procedure is the first connection failure after the terminal device 110 connected with the current serving cell, i.e. cell 102 (in this case, the connection between the terminal device 110 and the network device does not fail). If the failure of the first handover attempt to the cell 102 is the first connection failure, the terminal device 110 may remove the previous stored failure information, for example, the history failure information associated with any other cells than cells 101-104.

As another option, the terminal device 110 may determine whether the handover attempt to the cell 102 is triggered due to RLF or HOF. If the terminal device 110 determines that the handover attempt to the cell 102 is triggered due to RLF or HOF, the terminal device 110 may ignore the failure information In some example embodiments, the terminal device 110 may execute a further conditional handover attempt. For example, the terminal device 110 may transmit 225 an access request to one of the candidate cells, for example, cell 103 of the network device 120-3. Similarly, if the timer for a conditional handover attempt expiries and no response received from the network device 120-3, the handover attempt may be considered as a failed attempt.

If the handover attempt to the cell 103 is failed, the failure information of this failed conditional handover attempt may also be stored at the terminal device 110. As mentioned above, the failure information of the first conditional handover attempt has been stored.

In some example embodiments, the terminal device 110 may store 230 failure information of both the failure information of the first conditional handover attempt to the cell 102 and the failure information of the second conditional handover attempt to the cell 103 based on starting time points of the first and the second conditional handover attempts.

In some example embodiments, if the first conditional handover attempt to the cell 102 is the first conditional handover attempt in this conditional handover procedure, the terminal device 110 may only store the failure information of the first conditional handover attempt.

In some example embodiments, if the second conditional handover attempt to the cell 103 is the last conditional handover attempt in this conditional handover procedure, the terminal device 110 may only store the failure information of the second conditional handover attempt.

In some example embodiments, the terminal device 110 may store a predetermined number of the failed conditional handover attempt.

For example, if the predetermined number is 2 and the terminal device 110 may store the earliest failure, only the failure information of the first and the second conditional handover attempts may be stored. That is, any other failed conditional handover attempt occurred after the first and the second conditional handover attempt will not be stored anymore.

As another option, if the predetermined number is 2 and the terminal device may store the latest failure, in the case that the failure information of the first and the second conditional handover attempt has been stored, if a further failure information is to be stored, the terminal device 110 may determine whether a sum of the failure number of the previous stored failure information and the failure number of the further failure information exceeds a threshold number. If the sum exceeds the threshold number, some of the previous stored failure information may be removed to allow storing failure information of the further conditional handover attempt.

It is possible that some previous failure information has been stored at the terminal device 110 before the at least one conditional handover attempt initiated by the terminal device 110. The previous failure information may be referred to a RLF, a HOF or another CHO failure. The RLF may indicate that the connection between the terminal device 110 and the network device 120-1 is failed and the HOF may indicate that the terminal device has attempted to access a dedicated cell before the CHO and the access attempt is failed.

As an option, the failure information of the at least one conditional handover attempt may also be stored without removing the previous failure information.

As a further option, if the terminal device 110 stores a predetermined number of the failed conditional handover attempt. The terminal device 110 may determine whether a sum of a failure number associated with the previous failure information and a failure number associated with the failure information exceeds a threshold number of failure event allowed to be stored. If the terminal device 110 determines that the sum does not exceed the threshold number, terminal device 110 may store the failure information, without removing the previous failure information.

If the terminal device 110 determines that the sum exceeds the threshold number, terminal device 110 may removes part of the previous failure information to allow storing the failure information.

Referring back to FIG. 2, the terminal device 110 may further transmit 235 an access request to a further cell 104 of the network device 120-4 in the conditional handover procedure. If the terminal device 110 receives 240 a response from the network device indicating the access is acceptable, the terminal device 110 may determine 245 that the conditional handover attempt to cell 104 is successful.

As another option, the handover attempt to cell 104 may also be failed. However, the terminal device 110 may successful access to an available cell. That is, a connection between the terminal device 110 and network may be reestablished.

Both the cell 104 and the available cell may be referred to as a target cell as below.

The terminal device 110 may transmit 250, to the target cell, a message indicating information about at least one connection failure occurred at the terminal device is available.

For example, the message may comprise at least one of a failure type of at least one connection failure, i.e. one of the RLF, HOF and CHOF, the number of the at least one connection failure and information about the successful handover attempt to the target cell. In some embodiments, the failure report may also indicate the failure number occurred in the CHO procedure. An example for information about at least one connection failure, i.e. RLF variable of the terminal device may be represented in the table as below.

TABLE 1

| RLF variable |
| --- |
| VarRLF-Report UE variable |
| -- ASN1START |
| VarRLF-Report-r10 ::=        SEQUENCE { |
| rlf-Report-r10                      RLF-Report-r9, |
| plmn-Identity-r10                PLMN-Identity |
| } |
| VarRLF-Report-r11 ::=        SEQUENCE { |
| rlf-Report-r10                      RLF-Report-r9, |
| plmn-IdentityList-r11          PLMN-IdentityList3-r11 |
| } |
| VarRLF-Report-r16 ::=        SEQUENCE { |
| rlf-ReportList-r16               RLF-ReportList-r16, |
| cho-success-r16                  CHO-success-r16                    OPTIONAL, |
| } |
| RLF-ReportList-r16 ::=      SEQUENCE (SIZE (1..maxRLFrep)) OF RLF-Report-r9 |
| CHO-success-r16 ::=          SEQUENCE { |
| cho-success-cellID              PhysCellId, |
| measResultLastServCell-r9   SEQUENCE { |
|   rsrpResult-r9                  RSRP-Range, |
|   rsrqResult-r9                  RSRQ-Range                              OPTIONAL, |
| }, |

TABLE 1-continued

| RLF variable | | |
|---|---|---|
| OPTIONAL | | |
| measResultNeighCells-r9 | MeasResultList2EUTRA-r9 | OPTIONAL |
| locationInfo-r10 | LocationInfo-r10 | OPTIONAL, |
| ..., | | |
| } | | |
| -- ASN1STOP | | | maxRLFrep: the maximum number of connection failure that can be reported.
The value can be 4 or 5.

If the terminal device 110 receives 255 a request for the information about the at least one connection failure, the terminal device 110 may generate 260 a failure report. The failure report may comprise one of the previous failure information, the failure information and information about the successful handover attempt to the target cell.

In some embodiments, the information about the successful handover attempt to the target cell may comprise one or more parameters as following: an identifier of the target cell, the timestamp of access to the target cell, a location of the target cell, a channel condition of the target cell and a channel condition of at least one neighboring cell of the target cell.

In some embodiments, the failure report may indicate the type of the failure occurred at the terminal device and the failure information of each type. An example for failure report may be represented in the table as below.

TABLE 2

| failure report | | |
|---|---|---|
| RLF-Report-r9 ::= | SEQUENCE { | |
| measResultLastServCell-r9 | SEQUENCE { | |
|   rsrpResult-r9 | RSRP-Range, | |
|   rsrqResult-r9 | RSRQ-Range | OPTIONAL |
| }, | | |
| measResultNeighCells-r9 | SEQUENCE { | |
|   measResultListEUTRA-r9 | MeasResultList2EUTRA-r9 | OPTIONAL, |
|   measResultListUTRA-r9 | MeasResultList2UTRA-r9 | OPTIONAL, |
|   measResultListGERAN-r9 | MeasResultListGERAN | OPTIONAL, |
|   measResultsCDMA2000-r9 | MeasResultList2CDMA2000-r9 | OPTIONAL |
| } OPTIONAL, | | |
| ..., | | |
| [[  locationInfo-r10 | LocationInfo-r10 | OPTIONAL, |
|   failedPCellId-r10 | CHOICE { | |
|    cellGlobalId-r10 | CellGlobalIdEUTRA, | |
|    pci-arfcn-r10 | SEQUENCE { | |
|     physCellId-r10 | PhysCellId, | |
|     carrierFreq-r10 | ARFCN-ValueEUTRA | |
|    } | | |
|   } | | |
| OPTIONAL, | | |
|   reestablishmentCellId-r10 | CellGlobalIdEUTRA | OPTIONAL, |
|   timeConnFailure-r10 | INTEGER (0..1023) | OPTIONAL, |
|   connectionFailureType-r10 | ENUMERATED {rlf, hof} | OPTIONAL, |
|   previousPCellId-r10 | CellGlobalIdEUTRA | OPTIONAL |
| ]], | | |
| [[  failedPCellId-v1090 | SEQUENCE { | |
|   carrierFreq-v1090 | ARFCN-ValueEUTRA-v9e0 | |
|   } | | |
| OPTIONAL | | |
| ]], | | |
| [[  basicFields-r11 | SEQUENCE { | |
|   c-RNTI-r11 | C-RNTI, | |
|   rlf-Cause-r11 | ENUMERATED { | |
| |   t310-Expiry, randomAccessProblem, | |
| |   rlc-MaxNumRetx, t312-Expiry-r12}, | |
|   timeSinceFailure-r11 | TimeSinceFailure-r11 | |
|  } | | |
| OPTIONAL, | | |
|   previousUTRA-CellId-r11 | SEQUENCE { | |
|    carrierFreq-r11 | ARFCN-ValueUTRA, | |
|    physCellId-r11 | CHOICE { | |
|     fdd-r11 | PhysCellIdUTRA-FDD, | |
|     tdd-r11 | PhysCellIdUTRA-TDD | |
|    }, | | |
|    cellGlobalId-r11 | CellGlobalIdUTRA | OPTIONAL |
|   } | | |
| OPTIONAL, | | |
|   selectedUTRA-CellId-r11 | SEQUENCE { | |
|    carrierFreq-r11 | ARFCN-ValueUTRA, | |
|    physCellId-r11 | CHOICE { | |

TABLE 2-continued

| failure report | | |
|---|---|---|
| fdd-r11 | PhysCellIdUTRA-FDD, | |
| tdd-r11 | PhysCellIdUTRA-TDD | |
| } | | |
| } | | |
| OPTIONAL | | |
| ]], | | |
| [[ failedPCellId-v1250 | SEQUENCE { | |
| tac-FailedPCell-r12 | TrackingAreaCode | |
| } | | |
| OPTIONAL, | | |
| measResultLastServCell-v1250 | RSRQ-Range-v1250 | OPTIONAL, |
| lastServCellRSRQ-Type-r12 | RSRQ-Type-r12 | OPTIONAL, |
| measResultListEUTRA-v1250 | MeasResultList2EUTRA-v1250 | OPTIONAL |
| ]], | | |
| [[ drb-EstablishedWithQCI-1-r13 | ENUMERATED {qci1} | OPTIONAL |
| ]], | | |
| [[ measResultLastServCell-v1360 | RSRP-Range-v1360 | OPTIONAL |
| ]], | | |
| [[ logMeasResultListBT-r15 | LogMeasResultListBT-r15 | OPTIONAL, |
| logMeasResultListWLAN-r15 | LogMeasResultListWLAN-r15 | OPTIONAL |
| ]] | | |
| [[ connectionFailureType-r16 | ENUMERATED {rlf, hof, chof} | OPTIONAL, |
| ]] | | |
| rlf-InfoAvailable-r13 | ENUMERATED {true} | OPTIONAL, |
| rlf-InfoType1-r16 | ENUMERATED {rlf, hof, chof} | OPTIONAL, |
| CHOF-num-r16 | INTEGER (0..MaxCHOFrep) | OPTIONAL, |
| rlf-ReportReq-r9 | BOOLEAN, | |
| followingCHO-report | BOLLEAN, Optional | |

Then the terminal device 110 may transmit the failure report to the target cell.

In some embodiments, any failure occurred in the CHO procedure will not be stored at the terminal device 110. In other words, the failure associated with the CHO procedure will be ignored.

In some embodiments, the terminal device 110 may determine whether a radio link failure or a legacy handover failure has been occurred before the at least one conditional handover attempt. If the terminal device 110 determines the radio link failure or the legacy handover failure has been occurred before the at least one conditional handover attempt, the terminal device 110 may ignore the failure in the CHO procedure.

In this way, a new mechanism of the failure reporting may be achieved.

More details of the example embodiments in accordance with the present disclosure will be described with reference to FIGS. 3-5.

Figure 3:
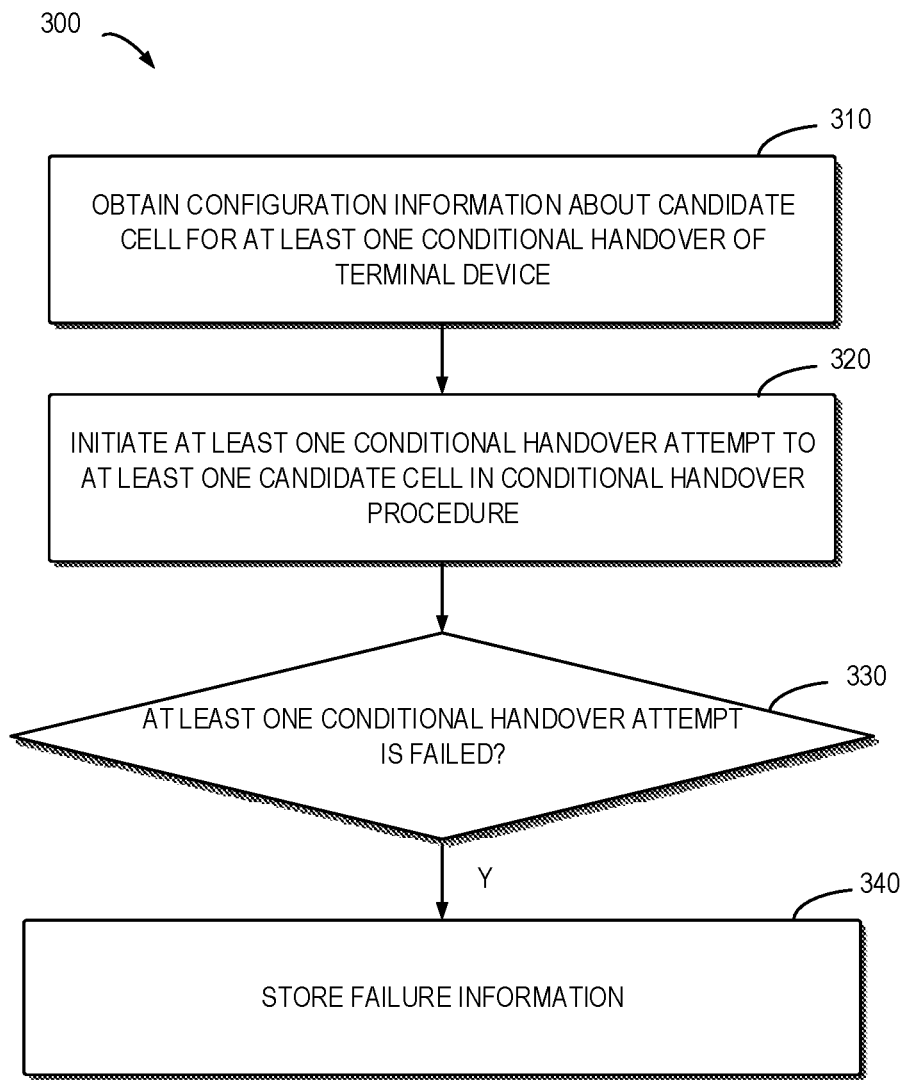
FIG. 3 illustrates a flowchart of an example method 300 in accordance with some embodiments of the present disclosure.

FIG. 3 illustrates a flowchart of an example method 300 in accordance with some embodiments of the present disclosure. The method 300 can be implemented at the terminal device 110 as shown in FIG. 1. For the purpose of discussion, the method 300 will be described with reference to FIG. 1.

At 310, the terminal device 110 obtains configuration information about at least one candidate cell for conditional handover of the terminal device.

At 320, the terminal device 110 initiates at least one conditional handover attempt to the at least one candidate cell.

At 330, if at least one conditional handover attempt to the at least one candidate cell in a conditional handover procedure is failed, the terminal device 110, at 340, stores failure information of the at least one conditional handover attempt.

At 330, if at least one conditional handover attempt to the at least one candidate cell in a conditional handover procedure is successful, the action of the terminal device may be described with reference to FIG. 4 as below.

Figure 4:
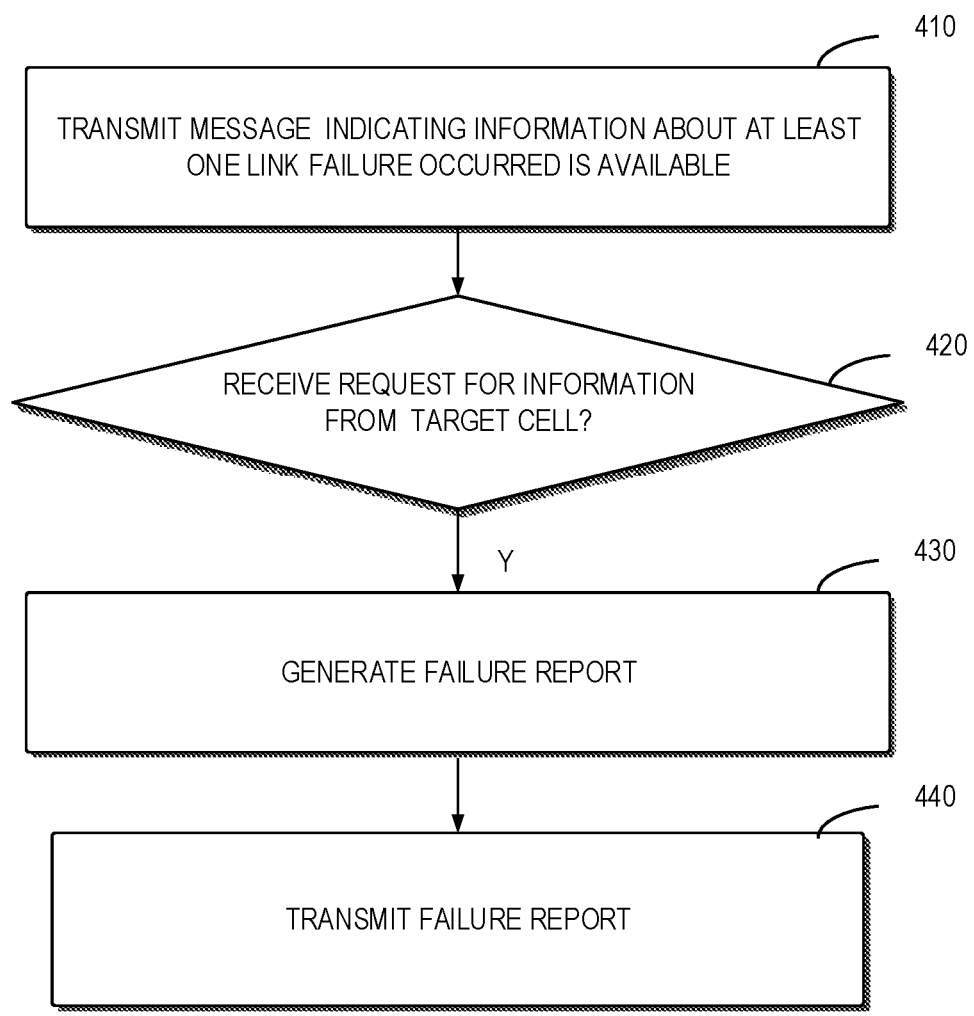
FIG. 4 illustrates a flowchart of an example method 400 in accordance with some embodiments of the present disclosure.

FIG. 4 illustrates a flowchart of an example method 400 in accordance with some embodiments of the present disclosure. The method 400 can be implemented at the terminal device 110 as shown in FIG. 1. For the purpose of discussion, the method 400 will be described with reference to FIG. 1.

At 410, the terminal device 110 transmits, to a target cell, a message indicating information about at least one connection failure occurred at the terminal device is available. The target cell may comprise one of the at least one candidate cell or an available cell other than the at least one candidate cell.

At 420, if the terminal device 110 receives a request for the information from the target cell, the terminal device 110, at 430, generating a failure report including at least one of the following: the previous failure information, the failure information and information about the successful conditional handover attempt.

At 440, the terminal device 110 transmit the failure report to the target cell.

Figure 5:
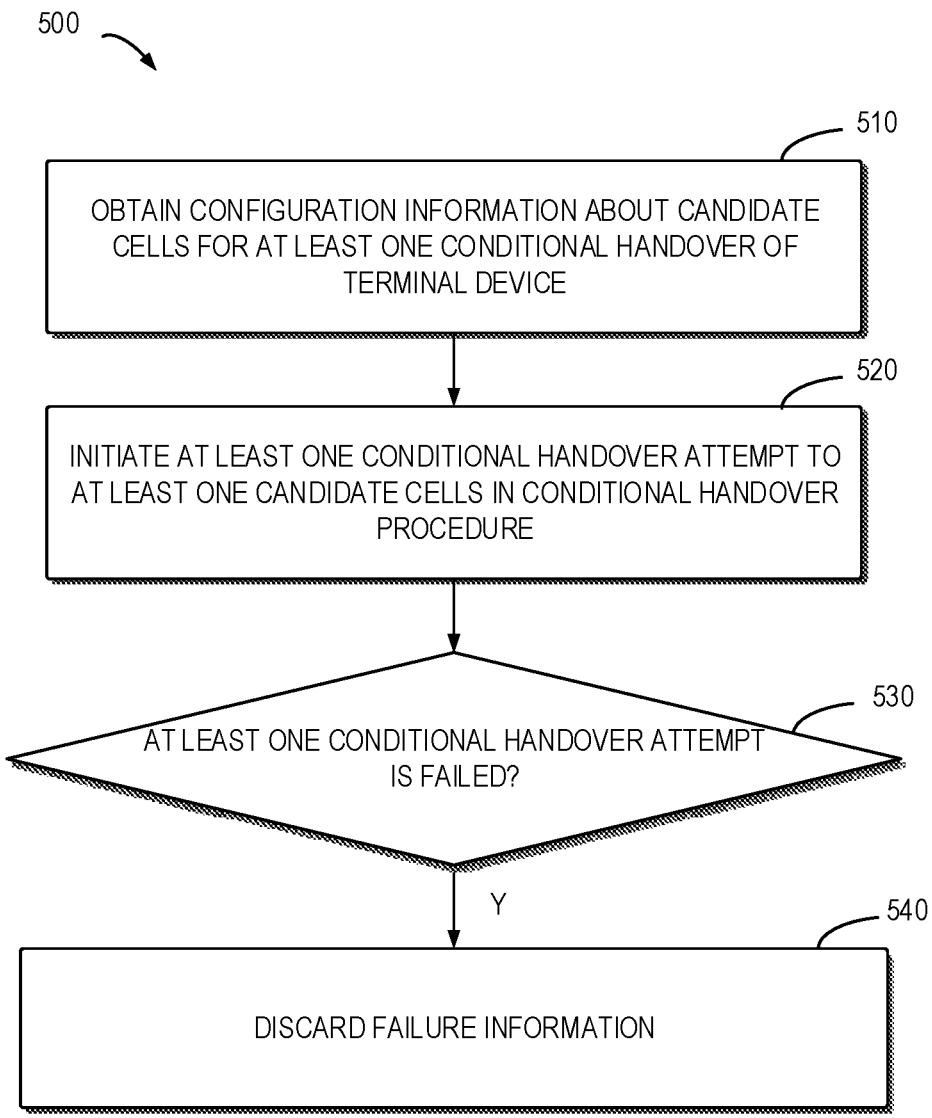
FIG. 5 illustrates a flowchart of an example method 500 in accordance with some embodiments of the present disclosure.

FIG. 5 illustrates a flowchart of an example method 500 in accordance with some embodiments of the present disclosure. The method 500 can be implemented at the terminal device 110 as shown in FIG. 1. For the purpose of discussion, the method 500 will be described with reference to FIG. 1.

At 510, the terminal device 110 obtains configuration information about at least one candidate cell for conditional handover of the terminal device.

At 520, the terminal device 110 initiates at least one conditional handover attempt to the at least one candidate cell.

At 530, if at least one conditional handover attempt to the at least one candidate cell in a conditional handover procedure is failed, the terminal device 110, at 440, ignores the failure of the at least one conditional handover attempt.

Figure 6:
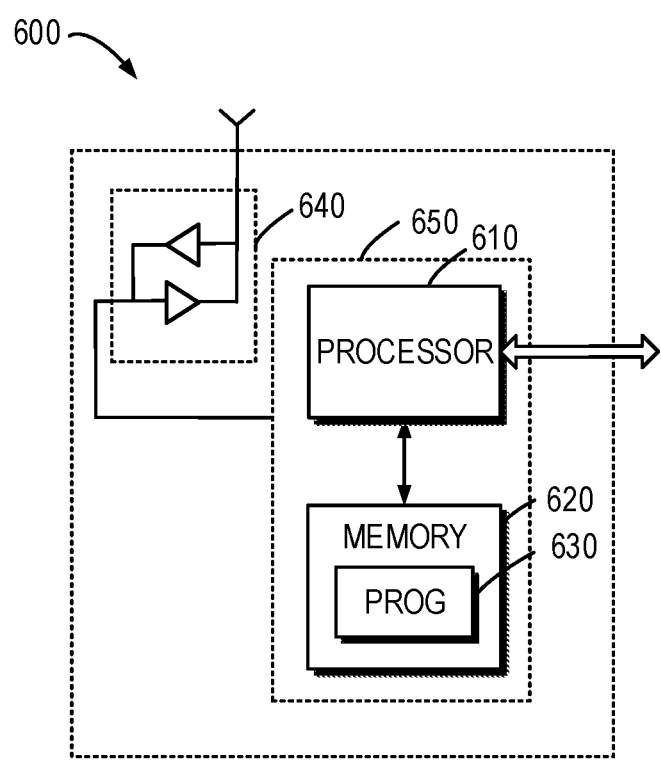
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the terminal device 110 as shown in FIG. 1. Accordingly, the device 600 can be implemented at or as at least a part of the terminal device 110.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 610 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 2-5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 610 may form processing means 650 adapted to implement various embodiments of the present disclosure.

The memory 610 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 610 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
receiving a conditional handover (CHO) configuration; and
storing failure related information of two consecutive failures comprising a first failure and a second failure, in a radio link failure (RLF) report, in response to the first failure and the second failure,
wherein the first failure is RLF in a source cell, and the second failure is selecting a configured candidate CHO cell and failing to connect to the configured candidate CHO cell, or
wherein the first failure is executing a CHO towards a first configured candidate CHO cell upon fulfilling a configured condition and experiencing a handover (HO) failure, and the second failure is selecting a second configured candidate CHO cell and failing to connect to the second configured candidate CHO cell, or
wherein the first failure is executing a HO towards a target cell and experiencing a HO failure, and the second failure is selecting a configured candidate CHO cell and failing to connect to the configured candidate CHO cell.

2. The method of claim 1, further comprising transmitting a message comprising information of a successful CHO, in response to the successful CHO.

3. The method of claim 2, wherein the information of the successful CHO comprising at least one of an identifier of the target cell or a location information.

4. A terminal device comprising a processor configured to:
receive a conditional handover (CHO) configuration; and
store failure related information of two consecutive failures comprising a first failure and a second failure, in a radio link failure (RLF) report, in response to the first failure and the second failure,
wherein the first failure is RLF in a source cell, and the second failure is selecting a configured candidate CHO cell and failing to connect to the configured candidate CHO cell, or
wherein the first failure is executing a CHO towards a first configured candidate CHO cell upon fulfilling a configured condition and experiencing a handover (HO) failure, and the second failure is selecting a second configured candidate CHO cell and failing to connect to the second configured candidate CHO cell, or
wherein the first failure is executing a HO towards a target cell and experiencing a HO failure, and the second failure is selecting a configured candidate CHO cell and failing to connect to the configured candidate CHO cell.

5. The terminal device of claim 4, wherein the processor is further configured to transmit a message comprising information of a successful CHO, in response to the successful CHO.

6. The terminal device of claim 5, wherein the information of the successful CHO comprising at least one of an identifier of the target cell or a location information.

* * * * *